UNITED STATES PATENT OFFICE.

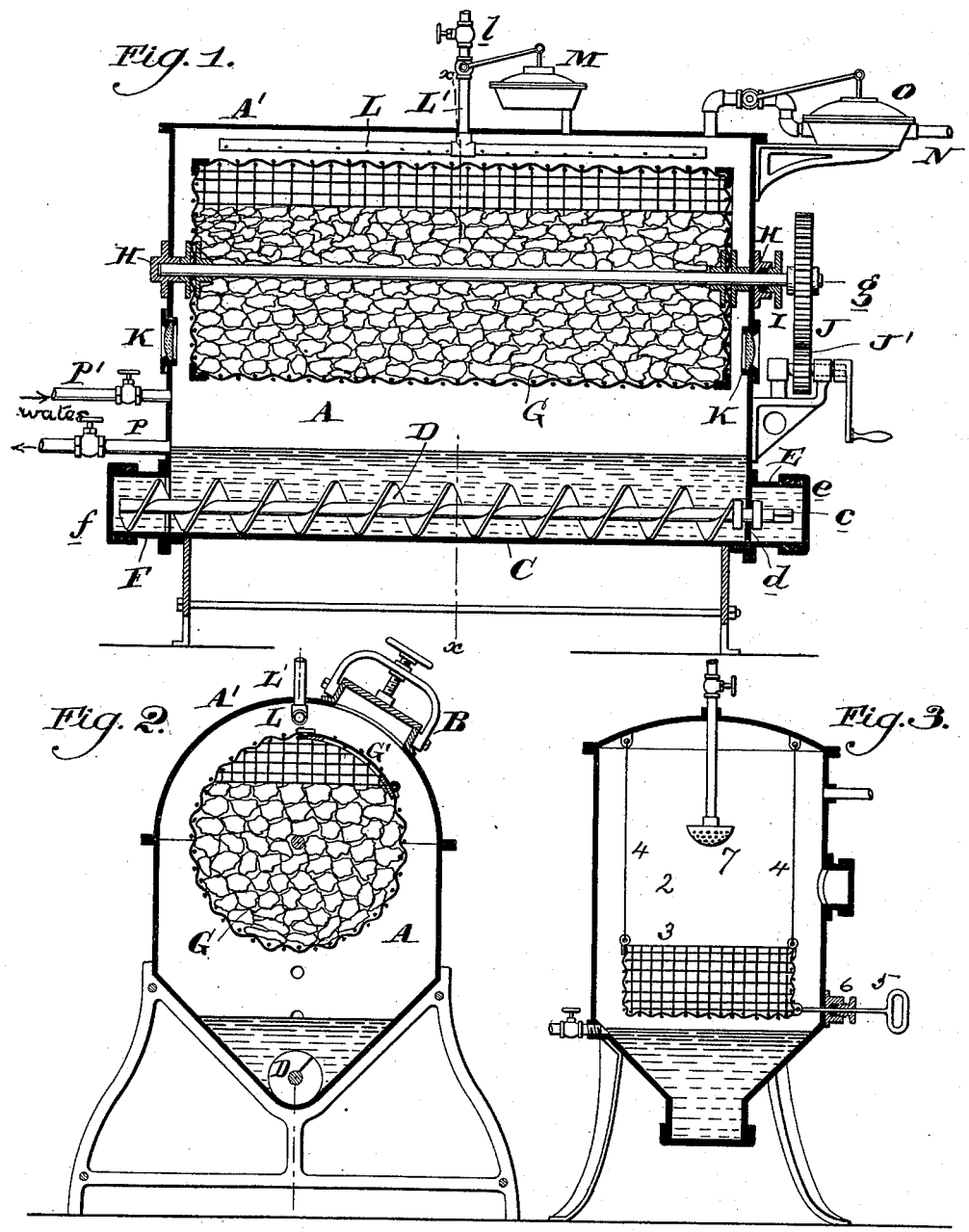

EDWARD J. DOLAN, OF PHILADELPHIA, PENNSYLVANIA.

PROCESS OF GENERATING ACETYLENE GAS.

SPECIFICATION forming part of Letters Patent No. 638,448, dated December 5, 1899.

Application filed December 8, 1896. Serial No. 614,890. (No model.)

*To all whom it may concern:*

Be it known that I, EDWARD J. DOLAN, of the city and county of Philadelphia, State of Pennsylvania, have invented an Improvement in Processes of Generating Acetylene Gas, of which the following is a specification.

My invention has reference to a process of generating acetylene gas in which water is brought into contact with fresh surfaces of carbid produced by agitating the carbid at intervals. The mechanism for carrying this process into effect is immaterial; but I have shown and described an operative mechanism for producing the desired result. I therefore describe a form of apparatus by means of which my invention may be carried into effect.

In carrying out my invention I provide a support for the carbid of calcium capable of being revolved or moved, so as to cause the carbid therein to rearrange itself and present new surfaces to the water, and combined therewith I provide means for bringing water automatically into contact with the carbid.

More specifically considered, my improved apparatus consists of a cage or support for the carbid of calcium supported upon suitable bearings, upon which it may be revolved or moved from without, and above which is arranged a spraying pipe or nozzle leading from a source of water-supply and provided with an automatic valve controlled by the pressure of gas generated to control the supply of the water in accordance with the demand.

In my preferred construction of apparatus I form the cage of open wire or metal work and support it in bearings within a gas-tight tank having gas-pipes leading to the burners and provide an extension from the said cage to without the tank, whereby the cage may be manipulated from the outside of the said tank, and with such apparatus I arrange a perforated water-spraying pipe within the tank and above the cage having its supply controlled automatically by the pressure of gas generated and at lower part of the tank a conveyer or feeding-screw for removing sediment and deposited waste matter.

My invention also comprehends details of construction not above specified, but fully disclosed in the accompanying drawings, in which—

Figure 1 is a sectional elevation of a gas-generator embodying my invention. Fig. 2 is a cross-section of same. Fig. 3 is a sectional elevation of a modified form of my apparatus.

A is the gas-tight tank, and may be supported upon suitable legs, if so desired. Preferably the top portion A' is removable and provided with a door B for charging purposes. The lower portion of this tank is provided with a horizontal gutter C, in which is fitted a conveyer or feeding-screw D. One end of the shaft of this screw is extended through a plate $d$ and held against longitudinal movement by collars and terminates in a square end $c$, by which to turn or rotate it when a crank is applied. Normally it is inclosed in a tubular extension E, having a removable cap $e$. The other end of the screw discharges directly into a tubular discharge-tube F, having a removable cap or plug $f$.

G is a cage cylindrical in form and made of any suitable open-work, and its shaft $g$ is journaled in the bearings H in the tank A. This open-work must be of large size, as shown, so as to permit of the escape of the produced lime, and must not be cloth or other material the meshes of which would be so fine as to prevent the escape of the lime. The shaft $g$ extends through the tank at one end and the joint is made gas-tight by a stuffing-box I. The end of this cage-shaft is provided with a spur-wheel J, which is driven by a pinion J' and a suitable crank. The cage G is provided with a suitable door or opening G', through which the carbid of calcium may be deposited, and, furthermore, the said opening must come in line with the door B. It is immaterial to my invention how the cage G is charged with the gas-producing materials. Glass sight-windows or bull's-eyes K may be employed, if so desired, so that the quantity of carbid of calcium within the cage may at any time be observed without opening the tank. This will indicate when the cage must be recharged.

Arranged above the cage G is a perforated or spraying pipe L, leading from a water-pipe L'. A valve $l$ controls the supply of water.

M is a suitable governor for operating the valve $l$ and is moved under the varying pressures in the tank. When the gas is generated and the pressure rises to the desired degree, the governor M shuts off the water. As the gas is consumed and the pressure reduced, the governor turns on the water automatically. Any type of governor may be used in place of that shown.

N is a gas-main leading from the tank A and may, if desired, be provided with a pressure-regulating governor O to cause a constant pressure in the mains irrespective of the varying pressures within the tank A.

If desired, a valved overflow-pipe P may be used on the tank A near the bottom, and a water-supply pipe P' may also be used for washing-out purposes. In this case the refuse lime is washed out in part by the flow of water (shown in the drawings) and also in part by opening the cap $f$.

The operation is as follows: Water is sprayed from pipe L upon the carbid in the cage generating acetylene gas, which escapes by pipe N and governor O. As the pressure increases the governor M closes the valve $l$ and shuts off the water. For the most perfect working the water should all be consumed by the carbid. Once in a while the cage G is turned so as to present new surfaces of the carbid to the water, and this also causes decomposed matters to become detached and fall to the bottom of the tank.

In the construction shown in Fig. 3 the tank 2 is provided with a cage of wire 3, hung by rods or chains 4 and movable by a handle 5, extending through a stuffing-box 6 in the side of the tank. By this means the cage and calcium carbid may be shaken at intervals. The water is sprayed from a nozzle 7 and controlled as in case of Fig. 1.

The water shown in the bottom of the apparatus, Fig. 3, may be used for washing-out purposes, but should not remain in the generator in operation. By the process shown the water which is sprayed upon the calcium carbid at intervals is consumed by the calcium carbid and no free water or vapors of water remain to attack the calcium carbid. In other words, the process is practically a dry process.

I do not confine myself to the details of construction, as these may be modified in various ways without departing from the principles of my invention.

What I claim as new, and desire to secure by Letters Patent, is—

1. The method of generating acetylene gas, which consists in superimposing a suitable body of loose, solid pieces of carbid of calcium upon each other so as to form a pervious mass, spraying or dropping water upon the said mass of calcium carbid, in such quantity as that it is enabled to percolate through said mass and to be wholly converted into gas by said mass of calcium carbid, and at intervals causing the pieces of carbid of calcium to be displaced relatively to each other and to rub against each other so as to expose fresh surfaces to the water, and to remove decomposed portions which fall away by gravity out of contact with the said mass of calcium carbid, substantially as described.

2. The method of generating acetylene gas, which consists in superimposing a suitable body of loose, solid pieces of carbid of calcium upon each other so as to form a pervious mass, in causing the pieces of carbid of calcium at intervals to be displaced relatively to each other, and to rub against each other so as to expose fresh surfaces, in supplying water to the said mass of carbid of calcium as the same may be needed for being wholly converted into gas by said mass of carbid of calcium, and in removing substances formed by the decomposition of the carbid of calcium, substantially as described.

In testimony of which invention I have hereunto set my hand.

EDWARD J. DOLAN.

Witnesses:
R. M. HUNTER,
WM. L. EVANS.